United States Patent
Meli et al.

(10) Patent No.: US 6,697,193 B1
(45) Date of Patent: Feb. 24, 2004

(54) SHARED VARIABLE GAIN AMPLIFIER FOR WDM CHANNEL EQUALIZATION

(75) Inventors: Fausto Meli, Piancenza (IT); Roberta Castagnetti, Monza (IT); Giorgio Grasso, Monza (IT)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/876,533

(22) Filed: Jun. 6, 2001

(51) Int. Cl.[7] .................................................. H01S 3/00
(52) U.S. Cl. ...................... 359/349; 359/160; 359/189; 359/341.32; 359/341.33; 359/134
(58) Field of Search ................................ 359/160, 189, 359/341.32, 341.33, 349, 134

(56) References Cited

U.S. PATENT DOCUMENTS

| | | | | |
|---|---|---|---|---|
| 5,331,449 A | * | 7/1994 | Huber et al. ................. | 359/125 |
| 5,392,154 A | * | 2/1995 | Chang et al. ................. | 359/124 |
| 5,452,116 A | * | 9/1995 | Kirkby et al. ................. | 359/124 |
| 5,701,194 A | | 12/1997 | Meli et al. ................... | 359/341 |
| 5,748,364 A | | 5/1998 | Meli et al. ................... | 359/341 |
| 5,808,787 A | | 9/1998 | Meli et al. ................... | 359/341 |
| 5,852,510 A | | 12/1998 | Meli et al. ................... | 359/341 |
| 5,914,795 A | * | 6/1999 | Jourdan et al. .............. | 359/134 |
| 5,946,117 A | * | 8/1999 | Meli et al. ................... | 359/124 |
| 5,986,800 A | * | 11/1999 | Kosaka ........................ | 359/133 |
| 6,025,954 A | | 2/2000 | Meli et al. ................... | 359/341 |
| 6,097,534 A | * | 8/2000 | Michishita et al. .......... | 359/124 |
| 6,151,160 A | * | 11/2000 | Ma et al. ..................... | 359/124 |
| 6,236,482 B1 | * | 5/2001 | Toyohara ..................... | 359/124 |
| 6,236,500 B1 | * | 5/2001 | Suzuki et al. ................ | 359/337.5 |
| 6,259,555 B1 | | 7/2001 | Meli et al. ................... | 359/337 |
| 6,307,668 B1 | * | 10/2001 | Bastien et al. ............... | 359/337.1 |
| 6,310,716 B1 | * | 10/2001 | Evans et al. ................. | 359/124 |
| 6,327,059 B1 | * | 12/2001 | Bhalla et al. ................ | 359/109 |
| 6,373,622 B1 | * | 4/2002 | Kosaka ........................ | 359/337.13 |
| 6,400,498 B1 | * | 6/2002 | Shimomura et al. ........ | 359/337 |
| 6,483,636 B1 | * | 11/2002 | Sugaya et al. .............. | 359/349 |

FOREIGN PATENT DOCUMENTS

| | | | |
|---|---|---|---|
| EP | 0 496 603 A1 | * | 1/1992 |
| EP | 0 734 129 A2 | | 9/1996 |
| EP | 0 766 358 A1 | * | 9/1996 |
| EP | 0 854 602 | * | 1/1998 |
| JP | 5-268169 | * | 10/1993 |

OTHER PUBLICATIONS

Yamada et al., "Broadband and Gain–Flattened amplifier composed of a 1.55 um–band and a 1.58 um–band Er3+ doped fibre amplifier in a parallel configuration." Elect. Lett. 33: Apr. 8, 1997, pp. 710–711.*

* cited by examiner

Primary Examiner—Thomas G. Black
Assistant Examiner—Stephen Cunningham
(74) Attorney, Agent, or Firm—Ritter, Lang & Kaplan LLP

(57) ABSTRACT

An amplification architecture for WDM receiver systems. The WDM channel grid is divided into groups of adjacent channels. A separate optical amplifier is provided for each channel with a single pump being shared among the channels of each group. The gain experienced by channels of a given group may be adjusted by varying the power of the group's pump. This approach allows equalization of received channel power such that all channels fall within the desired dynamic range. The amplification architecture may be implemented in a space-efficient manner at low cost.

19 Claims, 3 Drawing Sheets

SHARED VARIABLE GAIN AMPLIFIER FOR WDM CHANNEL EQUALIZATION

BACKGROUND OF THE INVENTION

The present invention relates to optical communications systems and more particularly to amplification in optical communications systems.

The explosion of communications services, ranging from video teleconferencing to electronic commerce, has spawned a new era of personal and business interactions. As evident in the rapid growth of Internet traffic, consumers and businesses have embraced broadband services, viewing them as a necessity. However, this enormous growth in traffic challenges the telecommunication industry to develop technology that will greatly expand the bandwidth limitations of existing communications systems. Further improvements in optical communications hold great promise to meet the demands for greater and greater bandwidth.

Wavelength Divisional Multiplexing (WDM) technology permits the concurrent transmission of multiple channels over a common optical fiber, thus expanding available bandwidth and providing other advantages in implementation. When it is necessary to recover data from the WDM signal, the individual wavelength components are isolated from one another and converted to electrical form by optical receivers. These optical receivers only operate correctly when the power level of their inputs is within a specified dynamic range. Typically amplification must be provided to bring the power level of the optical signals up to the necessary level due to losses in transmission and elsewhere.

FIG. 1 depicts a prior art approach to amplification within a WDM receiver system 100. WDM receiver system 100 has as its input a composite WDM signal 102 that includes, e.g., up to 200 wavelength components located on WDM channels spaced 25 GHz apart. An optical wavelength router (OWR) 104 incorporates a first deinterleaving block 106 that divides the 25 GHz grid into two grids having 100 WDM channels at 50 GHz spacings. Deinterleaving blocks 108 and 110 then further divide these two grids into four grids of 50 channels each at 100 GHz spacings. Each such grid is equipped with an amplifier 112 to bring the signal power level up to the level needed for correct optical receiver operation. A set of demultiplexers 114 then complete the separation of the WDM signal into its individual wavelength components.

Due to various wavelength-selective effects in the WDM link and demultiplexing components, there must be a way of varying gain across the overall grid. Otherwise, certain groups of WDM channels will have power levels outside the required dynamic range. This is particularly true when the dynamic range is relatively narrow as is the case with high data rate systems where the individual wavelength components are each modulated by 10 Gbps data streams or even higher data rate streams. Furthermore, these wavelength-selective effects are dependent on the particular installation and will vary over time. Unfortunately, each of amplifiers 112 may provide flat gain across the entire spectrum occupied by the 200 channel grid with no provision for adaptive equalization.

One way to vary gain across the spectrum to assure optimal receiver performance would be to install a variable gain optical amplifier with its own pump for each channel following demultiplexers 114. By controlling the pump powers of the individual pumps, an optical equalization function may be performed. Alternatively, a variable optical attenuator (VOA) may be installed for each channel. Unfortunately, these approaches are both very expensive and space-inefficient. Their expense and cumbersomeness increase further as the number of channels increases.

What is needed is an amplification architecture for WDM receiver systems that provides an appropriate amount of amplification for each WDM channel while economizing on component cost and space consumption.

SUMMARY OF THE INVENTION

One embodiment of the present invention provides an amplification architecture for WDM receiver systems. The WDM channel grid is divided into groups of adjacent channels. A separate optical amplifier is provided for each channel with a single pump being shared among the channels of each group. The, gain experienced by channels of a given group may be adjusted by varying the power of the group's pump. This approach allows equalization of received channel power such that all channels fall within the desired dynamic range. The amplification architecture may be implemented in a space-efficient manner at low cost.

A first aspect of the present invention provides apparatus for amplifying a plurality of optical signals in a WDM communications system carrying a plurality of WDM channels. The apparatus includes a first group of optical amplifiers, each of the first group of amplifiers amplifying a selected optical signal being carried by one of a first group of adjacent WDM channels, a second group of optical amplifiers each of the second group of amplifiers amplifying a selected optical signal being carried by one of a second group of adjacent WDM channels, the first optical energy source providing pump energy to amplifiers of the first group of optical amplifiers, and a second optical energy source providing pump energy to amplifiers of the second group of optical amplifiers.

A second aspect of the present invention provides a WDM receiver system in a WDM communications system carrying a plurality of WDM channels. The WDM receiver system includes: a demultiplexer that receives a composite optical signal and isolates components thereof corresponding to the plurality of WDM channels, a first group of optical amplifiers, each of the first group of amplifiers amplifying a selected optical signal being carried by one of a first group of adjacent WDM channels, a second group of optical amplifiers, each of the second group of amplifiers amplifying a selected optical signal being carried by one of a second group of adjacent WDM channels, a first optical energy source providing pump energy to amplifiers of the first group of optical amplifiers, a second optical energy source providing pump energy to amplifiers of the second group of optical amplifiers, and a plurality of receivers for recovering information transmitted via the plurality of WDM channels.

Further understanding of the nature and advantages of the inventions herein may be realized by reference to the remaining portions of the specification and the attached drawings.

DESCRIPTION OF SPECIFIC EMBODIMENTS

According to the present invention, in a WDM receiver system, amplification pump resources may be shared among a group of WDM channels. Each such group of channels typically corresponds to a subband of an overall WDM channel grid. Gain may be controlled on a group-by-group basis. This approach has been found to provide sufficient equalization to assure that signal powers on individual WDM channels remain within receiver dynamic range, even for the narrower dynamic ranges demanded by very high data rate systems, e.g., >10 Gbps.

The present invention will now be described with reference to a particular example WDM system. In the example WDM system, a 200 channel 25 GHz grid is used. Receiver dynamic range extends from −10 dBm to 0 dBm and the power per channel at the demultiplexer output is on the order of −18 dBm per channel. An amplification of 8–12 dB is desired. The present invention is, however, not limited to any particular number of channels, spacing between channels, or desired amplifier gain.

Figure 1:
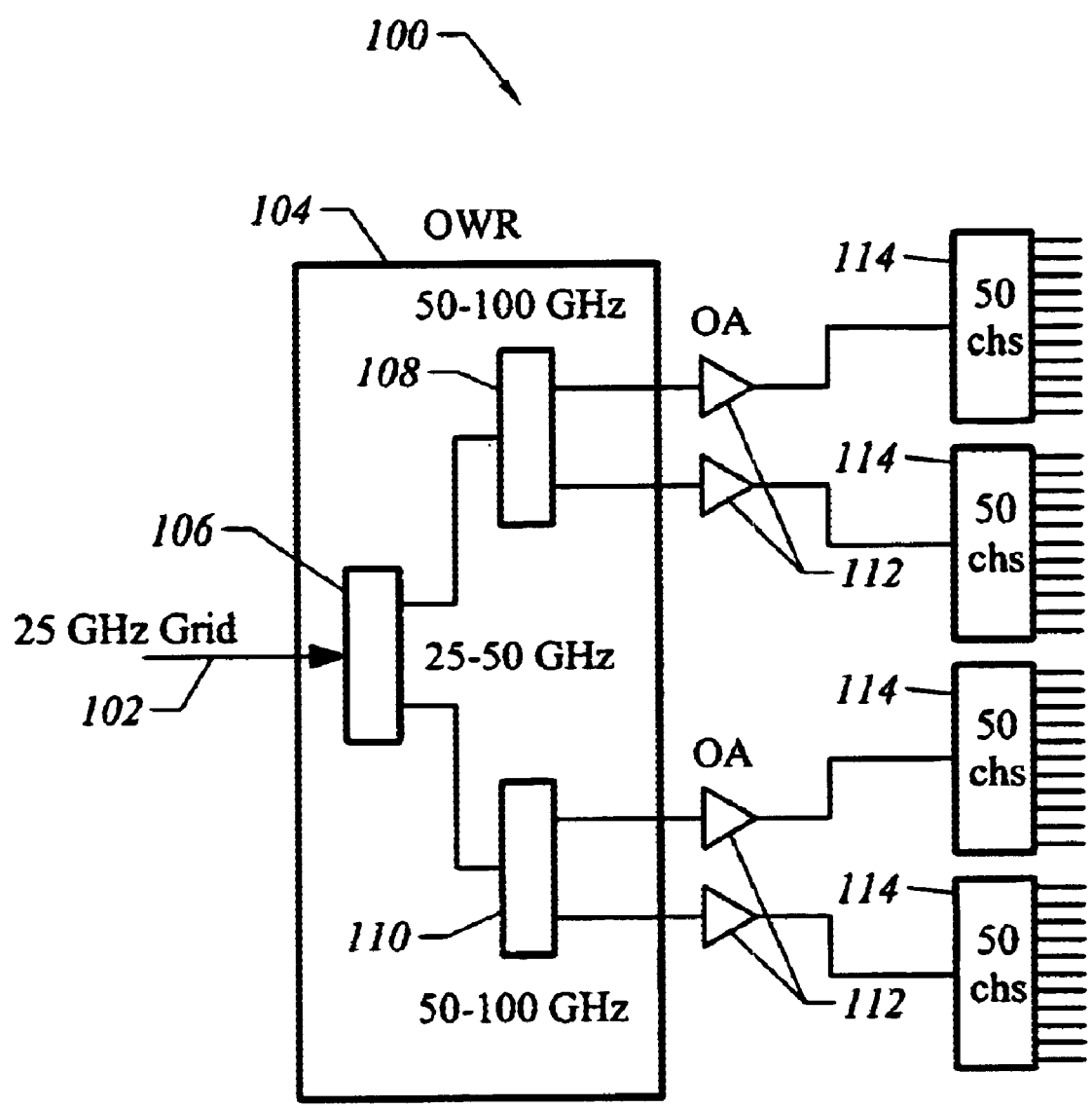
FIG. 1 depicts a prior art WDM amplification architecture.
Figure 2:
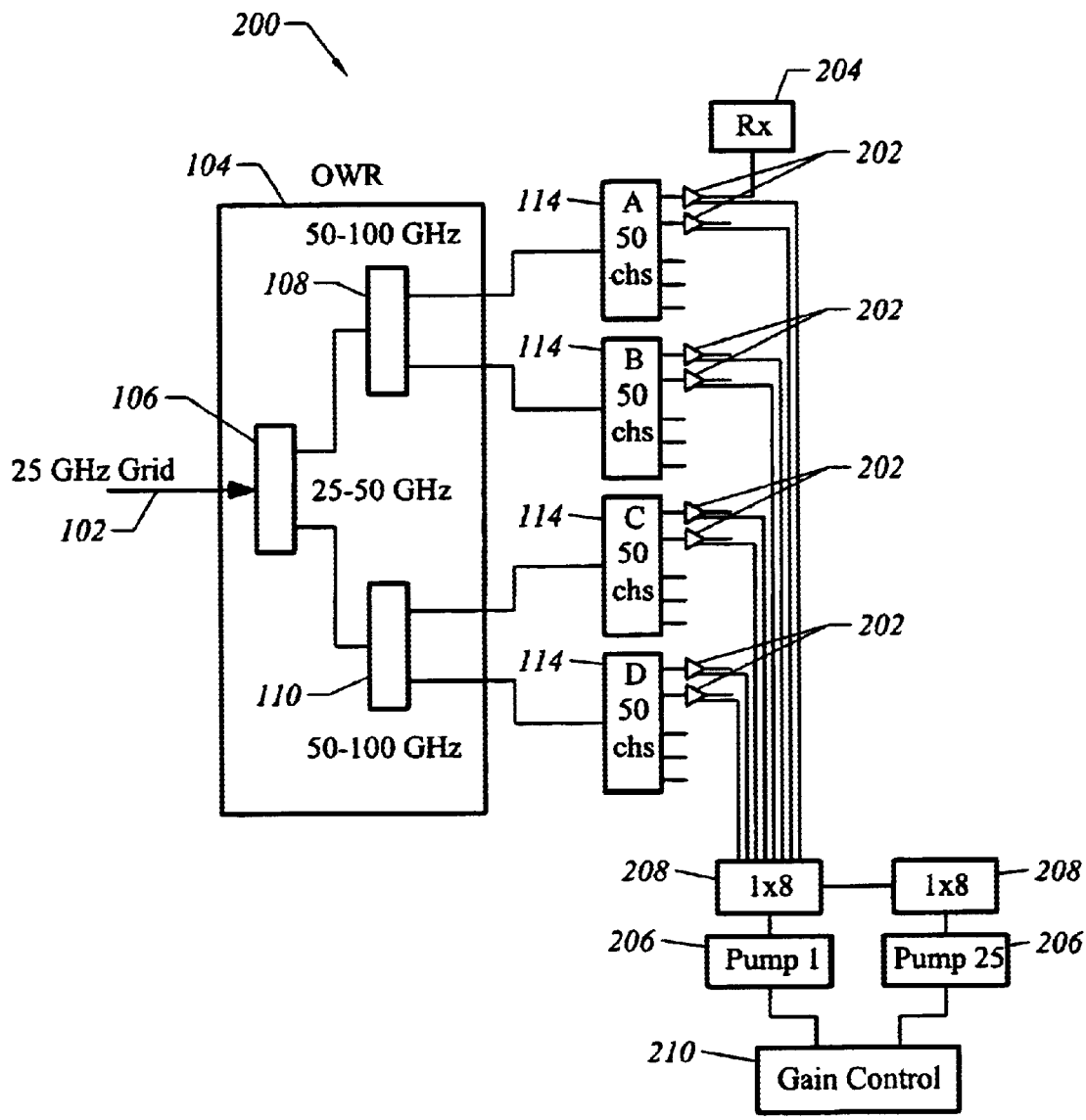
FIG. 2 depicts a WDM amplification architecture according to one embodiment of the invention.

FIG. 2 depicts a WDM amplification architecture according to one embodiment of the present invention. A WDM receiver system 200 incorporates amplification features according to the present invention. The input signal 102, optical wavelength router 104, deinterleaving blocks 108, 106, and 110, and demultiplexers 114 are similar to the like-labeled elements in FIG. 1. However, in FIG. 2, there is no counterpart to amplifiers 112 which in FIG. 1 separately amplified each 50 channel grid. Instead, each of the outputs of demultiplexers 114 has an associated optical amplifier 202. For ease of depiction, only two amplifiers 202 are shown for each of demultiplexers 114.

In one embodiment, each of amplifiers 202 is, e.g., an Erbium doped fiber amplifier (EDFA). Thus there is an active fiber coupled to each of the outputs of demultiplexers 114. These active fibers may be doped with elements other than erbium. For example, the active fibers may be doped with both erbium and ytterbium. The configuration of the active fiber is optimized in accordance with the band position of the channel to be amplified.

For each of the WDM channels, there is an associated optical receiver 204 coupled either directly or indirectly to the associated amplifier 202. For ease of illustration, only one optical receiver 204 is depicted. Optical receiver 204 incorporates a photodetector that converts an optical signal at a given WDM channel into an electrical signal as well as electronic circuitry to recover data from the electrical signal.

In accordance with the present invention, the WDM channel grid is divided into 25 groups of 8 channels each. Each such group spans a subband of the WDM channel grid. A common pump is used for each such group of 8 channels. For each group of eight amplifiers there is a single pump 206. The pump energy output by each of pumps 206 is split among the eight amplifiers 202 by a pump separator, implemented for example, by a splitter 208. For ease of depiction, only 2 pumps 206 and 2 splitters 208 are shown in FIG. 2. A typical pump power value for pump 206 may be, e.g., 250 mW assuming use of a 1×8 pump separator. In this way a gain of 8–12 dB may be achieved.

Figure 3:
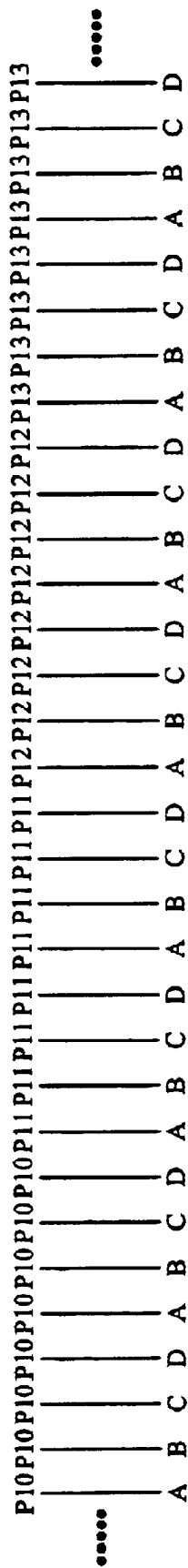
FIG. 3 depicts the division of the WDM channel grid into subgroups for amplification purposes according to one embodiment of the present invention.

FIG. 3 depicts a portion of the 200 channel grid containing 32 channels representing four groups. Each channel is marked either A, B, C, or D to indicate which of demultiplexers 114 outputs the labeled channel. These letter designators are also shown on the demultiplexers 114 in FIG. 2. Each channel is further marked with a label px where x denotes which of pumps 206 provides pump energy to amplify that channel. In this example, the pump requirements of each amplifier 202 are met by splitters that divide pump power into 8 paths for distribution to 8 amplifiers. Since this example also uses four demultiplexers 114, each pump 206 provides pump energy to two of the active fibers output by each demultiplexer. It will be seen that because there are twice as many pumps 206 as there are demultiplexers 114 in the depicted example, each pump provides pump energy to two of the active fibers output by a given demultiplexer.

A gain control block 210 sets the pump output power for each of the pumps 206. In this way, gain may be set for each of the subbands of the overall WDM channel grid by simply varying the drive current of the relevant pump. The gains set for each subband may be based on a power level measurement made within the receivers 204 of the corresponding group. The gain for each group will be set so that the input signal powers to the receivers 204 are maintained within the desired dynamic range. The gain control system takes advantage of the well-known property that the gains within a sub-band in a WDM system measured after a chain of optical components, including optical amplifiers, are likely to be closely correlated. It will thus be appreciated that the scheme described in FIG. 2 represents a savings not only in the number of components such as optical attenuators and/or pumps that are used but also in the additional gain control circuitry that would otherwise be needed for each WDM channel.

The scheme that has just been described scales very well with increasing WDM channel counts and grid density. Yet another advantage of the present scheme is that the capacity of an existing system may be expanded in a modular fashion. If an additional 8 channels are desired, one need only add 8 receivers, 8 active fibers and a single pump. Also, sufficient power margin may be provided to allow for per channel chromatic dispersion compensation.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents.

What is claimed is:

1. In a WDM communication system carrying a plurality of WDM channels, apparatus for amplifying a plurality of optical signals, said apparatus comprising:

a first group of variable gain optical amplifiers, each of said first group of amplifiers amplifying a corresponding one of a first group of adjacent WDM channels;

a second group of variable gain optical amplifiers, each of said second group of amplifiers amplifying a corresponding one of a second group of adjacent WDM channels;

a first optical energy source providing pump energy to amplifiers of said first group of optical amplifiers; and a second optical energy source providing pump energy to amplifiers of said second group of optical amplifiers; and wherein an output power of at least one of said first optical energy source or said second optical energy source is adjusted to provide equalization to at least one of said first group or second group of WDM channels.

2. The apparatus of claim 1 further comprising:

a demultiplexing system that separates said channels into a plurality of interleaved grids, wherein said first group of WDM channels and said second group of WDM channels each comprise WDM channels from more than one of said interleaved grids.

3. The apparatus of claim 2 further comprising:
a first splitter that divides said pump energy from said first optical energy source among said first group of optical amplifiers; and
a second splitter that divides said pump energy from said first optical energy source among said second group of optical amplifiers.

4. The apparatus of claim 2 wherein said first group of optical amplifiers comprises a group of active fibers.

5. The apparatus of claim 4 wherein said active fibers are doped with one or more rare-earth elements.

6. The apparatus of claim 5 wherein said one or more rare-earth elements comprise erbium.

7. The apparatus of claim 5 wherein said one or more rare earth elements comprise erbium and ytterbium.

8. In a WDM communication system carrying a plurality of WDM channels, a WDM receiver system comprising:
a demultiplexer that receives a composite WDM signal and isolates components thereof corresponding to said plurality of WDM channels;
a first group of variable gain optical amplifiers, each of said first group of amplifiers amplifying a corresponding one of a first group of adjacent WDM channels;
a second group of variable gain optical amplifiers, each of said second group of amplifiers amplifying a corresponding one of a second group of adjacent WDM channels;
a first optical energy source providing pump energy to amplifiers of said first group of optical amplifiers;
a second optical energy source providing pump energy to amplifiers of said second group of optical amplifiers; and
a plurality of receivers for recovering information transmitted via said plurality of WDM channels; and
wherein an output power of one of said first optical energy source or said second optical energy source is adjusted to provide equalization to said WDM receiver system.

9. The apparatus of claim 8 further comprising:
a first splitter that divides said pump energy from said first optical energy source among said first group of optical amplifiers; and
a second splitter that divides said pump energy from said first optical energy source among said second group of optical amplifiers.

10. The apparatus of claim 8 wherein said first group of optical amplifiers comprises a group of active fibers.

11. The apparatus of claim 10 wherein said active fibers are doped with one or more rare-earth elements.

12. The apparatus of claim 11 wherein said one or more rare-earth elements comprise erbium.

13. The apparatus of claim 11 wherein said one or more rare earth elements comprise erbium and ytterbium.

14. In a WDM communication system, a method for amplifying a plurality of optical signals, said method comprising:
demultiplexing a WDM signal to isolate said plurality of optical signals from one another and outputting said plurality of optical signals into a plurality of active fibers corresponding to a plurality of WDM channels;
pumping, using a first pump, optical energy into a first group of said active fibers corresponding to a first contiguous set of said WDM channels to cause amplification within said first group of active fibers;
pumping, using a second pump, optical energy into a second group of said active fibers corresponding to a second contiguous set of said WDM channels to cause amplification within said second group of active fibers; and
adjusting pump power of at least one of said first pump and said second pump for equalization among said plurality of WDM channels.

15. The method of claim 14 wherein demultiplexing comprises separating said channels into a plurality of interleaved grids, wherein said first contiguous set of WDM channels and said second contiguous set of WDM channels each comprise WDM channels from more than one of said interleaved grids.

16. The method of claim 15 wherein said active fibers are doped with erbium.

17. In a WDM communication system, apparatus for amplifying a plurality of optical signals, said apparatus comprising:
means for demultiplexing a WDM signal to isolate said plurality of optical signals from one another and output said plurality of optical signals onto a plurality of active fibers corresponding to a plurality of WDM channels;
means for pumping, using a first pump, optical energy into a first group of said active fibers corresponding to a first contiguous set of said WDM channels to cause amplification within said first group of active fibers; and
means for pumping, using a second pump, optical energy into a second group of said active fibers corresponding to a second contiguous set of said WDM channels to cause amplification within said second group of active fibers; and
wherein said means for pumping using said first pump comprises means for adjusting pump power for equalization among said plurality of WDM channels.

18. The apparatus of claim 17 wherein said means for demultiplexing comprises means for separating said channels into a plurality of interleaved grids, wherein said first contiguous set of WDM channels and said second contiguous set of WDM channels each comprise WDM channels from more than one of said interleaved grids.

19. The apparatus of claim 18 wherein said active fibers are doped with erbium.

* * * * *